(12) United States Patent
Clayton et al.

(10) Patent No.: US 10,794,808 B2
(45) Date of Patent: Oct. 6, 2020

(54) SYSTEM AND METHODS FOR ANALYZING PARTICLES IN A FLUID

(71) Applicant: Purdue Research Foundation, West Lafayette, IN (US)

(72) Inventors: Katherine Noel Clayton, West Lafayette, IN (US); Tamara Lea Kinzer-Ursem, West Lafayette, IN (US); Steven Truitt Wereley, West Lafayette, IN (US); Janelle Weslyn Salameh, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/072,572

(22) PCT Filed: Feb. 3, 2017

(86) PCT No.: PCT/US2017/016414
§ 371 (c)(1),
(2) Date: Jul. 25, 2018

(87) PCT Pub. No.: WO2017/136664
PCT Pub. Date: Aug. 10, 2017

(65) Prior Publication Data
US 2019/0072472 A1    Mar. 7, 2019

Related U.S. Application Data

(60) Provisional application No. 62/291,854, filed on Feb. 5, 2016.

(51) Int. Cl.
*G01N 15/02* (2006.01)
*G01N 15/00* (2006.01)

(52) U.S. Cl.
CPC . *G01N 15/0227* (2013.01); *G01N 2015/0038* (2013.01); *G01N 2015/0053* (2013.01); *G01N 2015/0238* (2013.01)

(58) Field of Classification Search
CPC .......... G01N 15/0227; G01N 15/0038; G01N 15/1463; G01N 15/10; G01N 2015/0053; G01N 2015/0038
See application file for complete search history.

(56) References Cited

U.S. PATENT DOCUMENTS

2007/0229823 A1    10/2007   Sung et al.
2014/0231619 A1     8/2014   Yamaguchi et al.

OTHER PUBLICATIONS

Venu M. Gorti, "Immunoassays in Nanoliter Volume Reactors Using Fluorescent Particle Diffusonnetry", Feb. 2, 2008, American Chemical Society (Year: 2008).*

(Continued)

*Primary Examiner* — Maurice C Smith
(74) *Attorney, Agent, or Firm* — Hartman Global IP Law; Gary M. Hartman; Domenica N. S. Hartman

(57) ABSTRACT

Methods and systems suitable for tracking Brownian motion of particles suspended in a fluid and determining the diffusion coefficient of the particles therefrom in order to characterize the particles, their synthesis, and/or their surface modifications. The methods include providing a sample having particles suspended in a fluid, obtaining and recording at least first and second images of the sample wherein the first image obtained at a first time and the second image subsequently obtained at a second time, determining the average displacement of the particles in an area of the first and second images during a time period between the first time and the second time based on the first and second images, and then determining a diffusion coefficient of the particles in the area of the first and second images based on (Continued)

the average displacement of the particles during the time period.

17 Claims, 9 Drawing Sheets

(56) References Cited

OTHER PUBLICATIONS

Bob Carr, "Nanoparticle Tracking Analysis A Review of Applications and Usage 2010-2012", 2013 (Year: 2013).*

Sivaramakrishnan Ramadurai, "Influence of Hydrophobic Mismatch and Amino Acid Composition on the Lateral Diffusion of Transmembrane Peptides". 2010, Biophysical Journal vol. 99, p. 1452 (Year: 2010).*

International Search Report and Written Opinion dated May 12, 2017 for PCT/US2017/016414.

Detmer, Simon L. et al. "Local characterization of hindered Brownian motion by using digital video microscopy and 3D particle tracking"; Review of Scientific Instruments, 2014, vol. 85,No. 2, article No. 023708, internal pp. 1-10; see Abstract; internal p. 2, left column, line 39, right column, line 15 and figures 1-5.

Kumar, Aloke et al., "Optical diffusometry techniques and applications in biological agent detection", Journal of Fluids Engineering, 2008, vol. 130, No. 11, article No. 11401, internal pp. 1-8, See internal pp. 1-4.

Modena, Mario M. et al., "Mass correlation spectroscopy for mass- and size-based nanoparticle characterization in fluid"; Journal of Applied Physics, 2015, vol. 118, No. 22, article No. 224901, internal pp. 1-11, See internal pp. 1-4.

Clayton, Katherine N. et al., "Physical characterization of nanoparticle size and surface modification using particle scattering diffusometry", Biomicrofluidics, Sep. 21, 2016 (e-pub), vol. 10, No. 5, article No. 054107, internal pp. 1-14; See internal pp. 2-12; and figures 1-5.

* cited by examiner

SYSTEM AND METHODS FOR ANALYZING PARTICLES IN A FLUID

BACKGROUND OF THE INVENTION

The present invention generally relates to particle analysis. The invention particularly relates to imaging methods and systems for characterization of nanoparticles.

Current methods used to characterize nanoparticle synthesis and surface modifications include surface enhanced Raman spectroscopy, Fourier transform infrared spectroscopy (FTIR), electron microscopy, ultraviolet-visible spectroscopy (UV-Vis), and dynamic light scattering (DLS). Of these techniques, DLS is the most commonly used, measuring particles down to sub-nanometer sizes (e.g., less than one nanometer). This well-established method requires information from the user such as refractive index (RI), absorption coefficient, and properties of the fluid medium. This information is not always known a priori and surface modifications may, in fact, change some of these properties.

Notable examples of the use of nanoparticles (i.e., particles with a maximum dimension of less than one micrometer) in bio-nanotechnology include, but are not limited to, vehicles for nanomedicine, visual aids in point-of-care diagnostics, markers in immunohistochemistry, and detectors in biosensor design. In these exemplary applications, proteins that are conjugated onto nanoparticles can vary dramatically in size, from a Stokes radius of as small as 7 Å to as large as 1 and molecular weights from 10,000 Da to greater than 300,000 Da. Without a fluorescent label, it can be difficult to determine whether these biomolecules have been tethered to the particle surface, and nanoparticles formed of certain materials, such as gold, may quench fluorescence. Nonetheless, it may be important to characterize the addition of protein to nanoparticles, especially in applications where protein activity, proper structural folding, and catalysis are key factors. Thus, the development of practical tools for characterizing biomolecule conjugated nanoparticles would advance the bio-nanotechnology field into new application areas and provide improved quantitative measurements.

Accordingly, there is an ongoing desire for methods and systems capable of characterizing nanoparticles, as well as their synthesis and surface modifications.

BRIEF DESCRIPTION OF THE INVENTION

The present invention provides methods and systems suitable for tracking Brownian motion of particles suspended in a fluid and determining the diffusion coefficient of the particles therefrom in order to characterize the particles, their synthesis, and/or their surface modifications.

According to one aspect of the invention, a system is provided that includes an imaging device, means for recording a series of images of a fluid sample comprising particles suspended therein over a period of time, means for analyzing the series of images to determine an average displacement of the particles over the time period, and means for determining a diffusion coefficient of the particles based on the average displacement of the particles.

According to another aspect of the invention, a method is provided that includes providing a sample having particles suspended in a fluid, obtaining and recording at least first and second images of the sample wherein the first image is obtained at a first time ($t_1$) and the second image is subsequently obtained at a second time ($t_2$), determining the average displacement of the particles in an area of the first and second images during a time period ($\Delta t$) between the first time ($t_1$) and the second time ($t_2$) based on the first and second images, and then determining a diffusion coefficient of the particles in the area of the first and second images based on the average displacement of the particles during the time period ($\Delta t$).

According to another aspect of the invention, a method is provided that includes providing a sample having particles suspended in a fluid, obtaining and recording a series of images of the sample over a period of time, partitioning each of the series of images into interrogation areas, determining the average displacement of the particles in each of the interrogation areas in each of the series of images over the time period, determining a diffusion coefficient of the particles in each of the interrogation areas in each of the series of images based on the average displacement of the particles, and then determining an average diffusion coefficient of the particles by averaging the diffusion coefficients in each of the interrogation areas in each of the series of images.

Technical effects of the methods and systems described above preferably include the ability to determine the diffusion coefficient of nanoparticles in a sample more accurately than conventional techniques, and without the need of certain foreknowledge about the sample (e.g., parameters such as refractive index (RI), absorption coefficient, and properties of the fluid medium).

Other aspects and advantages of this invention will be further appreciated from the following detailed description.

DETAILED DESCRIPTION OF THE INVENTION

The present invention generally provides methods and systems for performing image-based analysis of particles using particle diffusometry (PD). Imaging methods as described herein may be used to visually detect particles, calculate a diffusion coefficient of the particles, and therefore characterize small, label-free, biomolecular surface modifications. These processes include imaging particles over time, determining the Brownian movement of the particles during the observed time period, and then using this information to analyze the particles. These processes provide the ability to determine the size, uniformity, and/or biomolecule conjugation characterization of conjugated nanoparticle solutions in smaller volumes and in less time than conventional techniques.

PD as disclosed herein involves measuring the diffusivity of particles undergoing Brownian motion. For example, particle motion in a fluid may be recorded with an imaging device, for example a camera, coupled to a microscope, over a predetermined time period and the recorded video (or series of images) of the particles may then be analyzed. During data analysis, each image (frame) of the recorded video may be partitioned into smaller areas (interrogation windows) such that, for example, on average eight to ten particles occupy each area. The average displacement of the particles within each area during the time between images may be determined using Fast Fourier Transforms (FFT), for example, with a Particle Image Velocimetry (PIV) computer software program.

Figure 1:
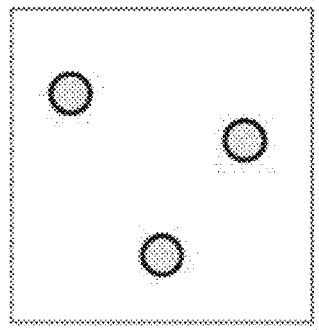
FIG. 1 schematically represents sequential images (frames) showing nanoparticle Brownian motion during the time between frames 1 and 2. An analyzer can detect this change in the displacement of the nanoparticles in order to calculate the correlation in accordance with certain nonlimiting aspects of the present invention.
Figure 1:
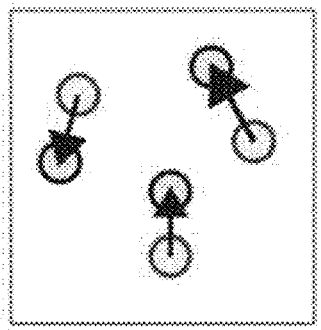

Two different correlations are preferably computed using the FFT from which the diffusion coefficient may be extracted. A first of the correlations may be an autocorrelation, which is determined by correlating an area with itself. A second of the correlations may be a cross-correlation, calculated by correlating an area from a first image acquired at time $t_1$ with the same area from a second image acquired subsequently at time $t_2=t_1+\Delta t$, where $\Delta t$ is the time between the consecutive first and second images (FIG. 1).

Figure 2:
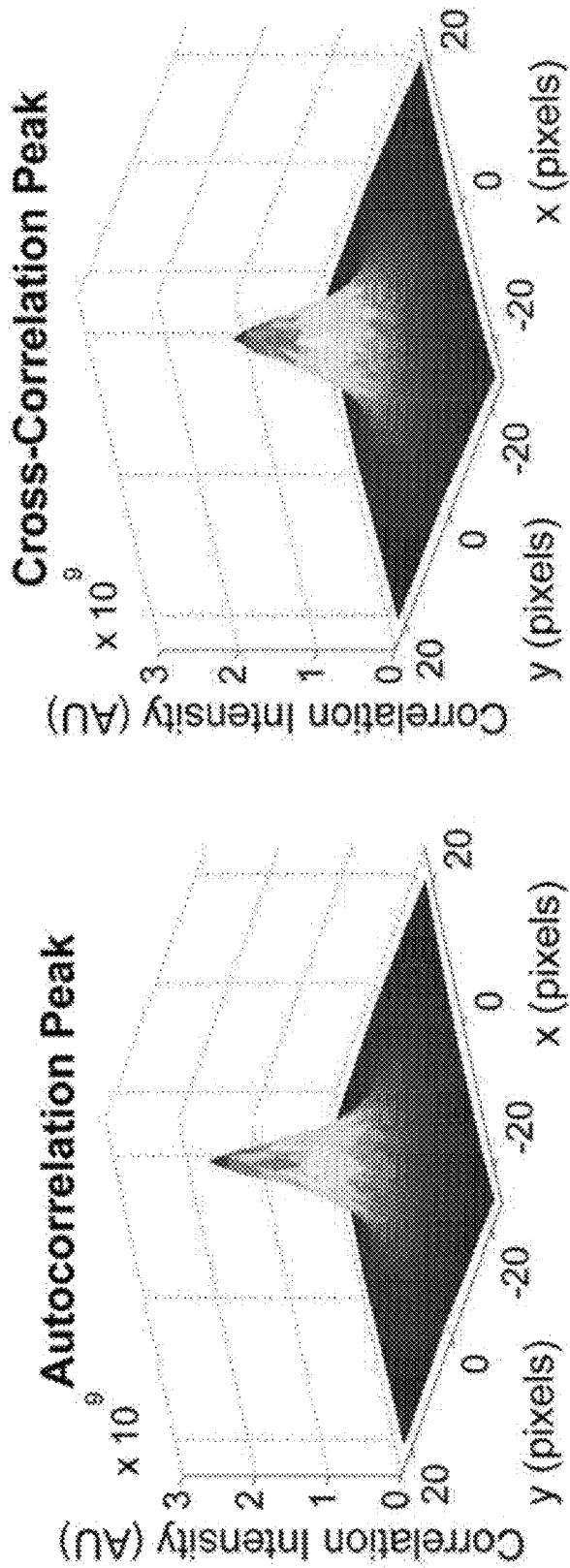
FIG. 2 schematically represents an autocorrelation peak (left) and a cross-correlation peak (right) of nanoparticles in a liquid as determined by particle diffusometry (PD). The autocorrelation peak is taller and narrower than the cross-correlation peak. The difference between the peak areas (along with magnification and time between images) provides the diffusion coefficient value.

The correlation data may be fitted to a Gaussian distribution in order to measure the peak widths of both the auto- and cross-correlation data. The diffusion coefficient can then be calculated from the auto- and cross-correlation peak widths using the expression $$D = \frac{s_c^2 - s_a^2}{16\, M^2\, \Delta t} \quad (1)$$

where the diffusion coefficient, D is determined from $s_c$ and $s_a$, which are the auto- and cross-correlation peak widths measured at 1/e of the peak height (FIG. 2). M represents the magnification under which the particle images were recorded.

This fundamental equation was originally established in the context of PIV applications in order to understand how the velocity measurement uncertainty depended on temperature, but is applicable for PD to determine the diffusion coefficient of a species of particles. Because diffusion is essentially thermal noise, a large population of repeated measurements may be needed in order to accurately measure it. The diffusion coefficients calculated from each area in an image can be averaged together to produce a more precise measure of the diffusion coefficient. Averaging over more images can increase the precision still further.

PD is fundamentally different than other diffusion-based measurement techniques. In PD, unlike methods such as Nanoparticle Tracking Analysis (NTA), particles are analyzed in a continuum, meaning that individual trajectories are not calculated, but rather correlation is used to determine the difference in the displacement of many particles between image frames. This is known as an Eulerian approach. Because groups of particles are analyzed using correlation, PD is statistically robust. In contrast, NTA and the technique on which it is based, Particle Tracking Velocimetry (PTV), calculate particle size based on their trajectories in space. Multiple calculated particle trajectories are used to calculate the averaged mean squared displacement (MSD) curve, which is used to determine the diffusion coefficient. This is what is known as a Lagrangian approach.

The diffusion coefficient calculated from the particles' motion can be related to the fluid and particle parameters via the Stokes-Einstein equation, $$D = \frac{kT}{6\pi\mu a} \quad (2)$$

where T is the absolute temperature, µ is the dynamic viscosity of the fluid medium, k is Boltzmann's constant, and a is the hydrodynamic radius. Combining these relationships, the particle hydrodynamic radius a is inversely proportional to diffusivity and hence to the area difference between the cross-correlation and autocorrelation peaks (multiply the numerator of Equation 1 by π). Thus, PD can be used to characterize properties that affect particle size as well as other fluid and particle parameters.

In addition to calculating the diffusion coefficient of a particle population, PD may also be used to measure the Polydispersity Index (PdI) of the sample. PdI is a parameter used to estimate the average uniformity of a particle solution. Larger PdI values correspond to a larger size distribution in the particle sample and can indicate particle aggregation and/or the consistency and efficiency of particle surface additions throughout the particle sample. As used herein, a sample is considered monodisperse when the PdI value is less than 0.1.

Particle PdI may be measured by using PD to evaluate the particle Brownian motion in the areas in the series of images. Each area has its own auto-correlation and cross-correlation values, which are used to calculate the diffusion coefficient. Thus, each area in the image has a separate diffusion coefficient value. If each and every interrogation area exhibits a different diffusion coefficient, this indicates that there is also a relative difference in the particle's size. The greater the difference in the diffusion coefficient for each interrogation area, the larger the variety in particle size within the image. Based upon the Stokes-Einstein equation, the change in the particle's diffusion coefficient (D) is inversely related to its hydrodynamic radius. Each diffusion coefficient value may be plotted in a histogram and a normal distribution may then be fit to the data. From this fit, the PdI can be calculated from $$PdI = \left(\frac{\sigma}{2a}\right)^2 \quad (3)$$

where σ is the standard deviation of the particle sizes measured in the normal distribution and a is the mean hydrodynamic radius.

PD analyzers are preferably capable of sizing particles and determining the uniformity of particle samples. Preferably, such analyzers are capable of analyzing particles having sizes (diameters or maximum dimension) of 20 µm or less, preferably nanoparticles having sizes of 100 nm or less, and more preferably between 100 nm and 30 nm or less. The lower limit in particle size depends on the sensitivity and fundamentals of the equipment used. For example, dark field and/or fluorescence microscopy are currently believed to be capable of analyzing particles as small as 30 nm suspended in fluid samples containing as little as one microliter of fluid. The upper limit of particle size is limited only by the ability of the particle to remain in solution over the time of the analysis, which is dependent on the density, size, and charge of the particle and not on the PD analyzer. Consequently, PD analyzers may be capable of analyzing the size of particles over a relatively large range, for example, 20 µm to 30 nm. Such PD analyzers are believed to be more accurate in sizing nanoparticles than conventional techniques (e.g. Dynamic Light Scattering or Nanoparticles Tracking Analysis). These analyzers are believed to be beneficial not only for nanoparticle sizing but also for protein kinetics studies and bioassays. For such exemplary applications, the analyzers preferably are capable of analyzing particles as small as 30 nm, and measuring analyte modifications down to single protein layers.

Figure 3:
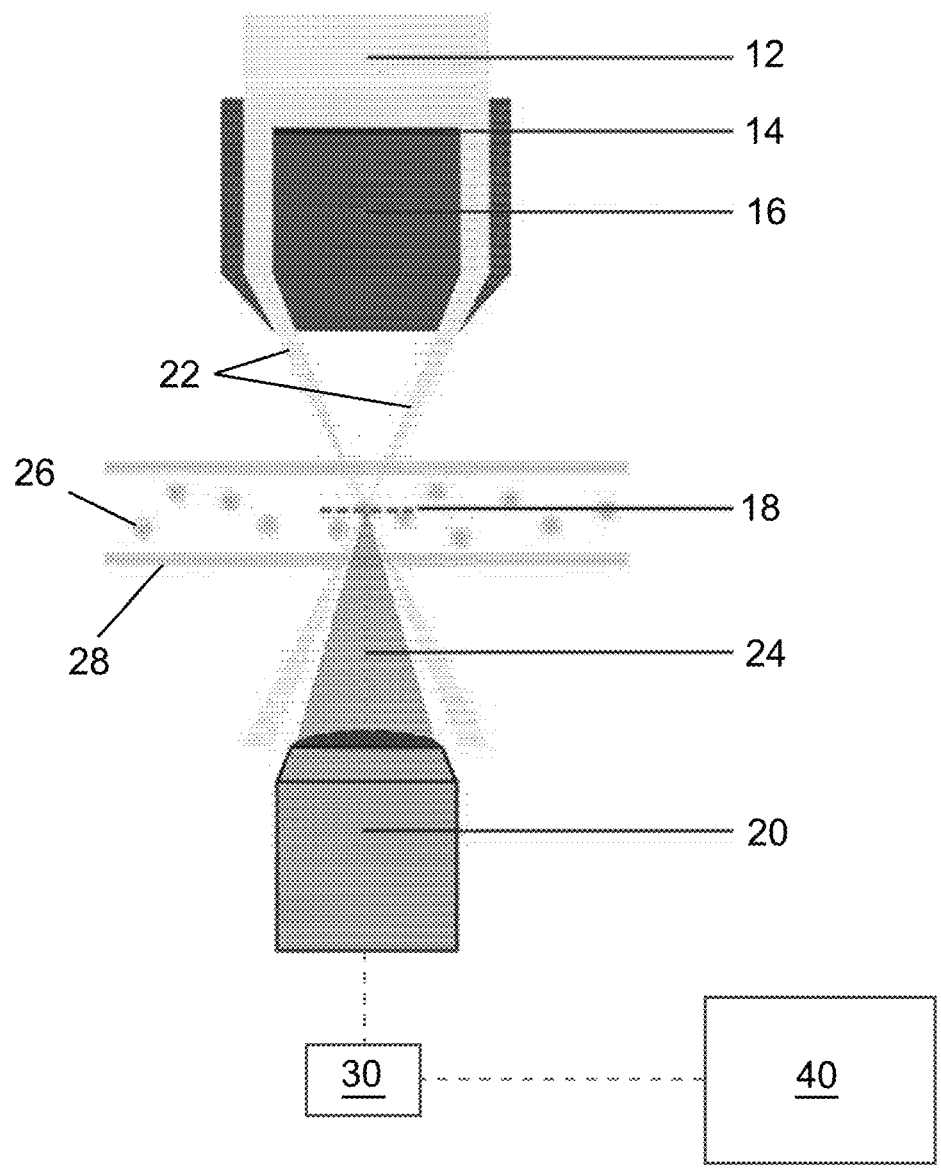
FIG. 3 schematically represents a nonlimiting analyzer having a dark field attachment placed on an inverted microscope. A condenser blocks most light emitted by a white light source, focusing the emitted light to a small point within the specimen plane but outside the collection angle of the objective lens of the microscope. Only light scattered by the particles is collected by the objective lens of the microscope.

A nonlimiting PD analyzer is schematically represented in FIG. 3 as comprising an inverted microscope having a dark field attachment and configured to image and analyze particles 26 suspended in a fluid medium within a fluid chamber 28. In this embodiment, the analyzer uses dark field imaging to allow a user to image particles 26 preferably as small as thirty nanometers in diameter or even smaller, depending on the sensitivity of a camera 30 coupled to the microscope. Using a dark-field attachment, the analyzer is capable of imaging and analyzing particles 26 having a size that is below the diffraction limit of the analyzer. A light stop 14 and condenser 16 of the dark field attachment blocks a majority of the white light source 12 of the microscope, allowing emitted light 22 to focus at a relatively small point within a plane 18 of fluid chamber 28, but outside the collection angle of the objective lens 20 of the microscope. As such, only light scattered 24 by particles 26 in the fluid chamber 28 is collected by the objective lens 20. Images captured by the camera 30 may be recorded and analyzed by, for example, a computer 40 functionally connected to the camera 30 and/or microscope.

The nonlimiting PD analyzer represented in FIG. 3 and described above uses dark-field microscopy to analyze particles 26 in the fluid chamber 28. Alternatively, a PD analyzer may include a fluorescence microscope and a camera to capture images of particles 26 suspended in the fluid chamber 28. Another embodiment may include a PD analyzer having a microscope (inverted or upright; no dark-field attachment) and a camera to capture images of particles 26 suspended in the fluid chamber 28. Yet another alternative embodiment may include PD analyzer having a camera to capture images of particles 26 suspended in the fluid chamber 28, wherein the particles 26 are large enough so that they are visible without microscopy.

In the setup represented in FIG. 3, the fluid chamber 26 may be configured to enclose various volumes of the fluid medium, for example, from less than several nanoliters to greater than several milliliters. In order for particle motion not to be hindered by the presence of a wall, the particles 26 are preferably imaged at least ten particle diameters away from any wall or edge of the fluid chamber 28. In practical terms, this means that the fluid chamber 28 is preferably structured with sufficient height and depth to allow imaging of particles 26 that are at least ten particle diameters from the walls of the fluid chamber 28. Generally, this is unlikely to be a limiting factor when considering nanoparticle size (i.e., less than one micrometer).

If the particles 26 are relatively small (about 200 nm in diameter or less), they are preferably formed of a material capable of scattering light suitably well in order to be visible. Therefore, metallic particles such as gold or silver are preferred for use with the analyzer. The concentration of these particles 26 may be optimized such that particle-particle interactions, which also hinder diffusion, are avoided but the particles 26 are still close enough together to capture many particles 26 in each image, reducing measurement noise. This preferred particle concentration is determined so that, on average, particles 26 are located at least ten particle diameters away from one another. The fluid chamber 28 is preferably a closed system in order to minimize evaporation of the fluid medium and unintentional flow through the fluid chamber 28. Evaporative effects may cause a net flow field that can disrupt PD measurements. Given these considerations, PD can be integrated at any stage within a micro- or nano-fluidic device where the particles 26 can be imaged.

Nonlimiting embodiments of the invention will now be described in reference to experimental investigations leading up to the invention.

In order to characterize biomolecule conjugation onto particles, several biologically relevant proteins (bovine serum albumin, lysozyme, and calmodulin) were covalently attached to gold nanoparticles (AuNPs). PD was used to measure the difference in Brownian motion between these samples compared to bare AuNPs. These proteins were chosen because they vary in size and charge from each other (Table 1) and are used in various biological applications. Bovine serum albumin (BSA) is a well-characterized blood serum protein that is commonly used as a blocking agent to minimize nonspecific protein interactions and nonspecific protein adsorption onto surfaces. Lysozyme is a hydrolase enzyme found in eukaryotes as part of the innate immune system. It is often used in vitro to break down bacterial cell walls and used widely in protein crystallography. Calmodulin (CaM) is a calcium ion ($Ca^{2+}$) binding protein found in all eukaryotic cells that modulates cellular responses to $Ca^{2+}$ flux by binding and activating over 100 downstream target proteins. Calmodulin, along with green fluorescent protein, have been engineered to be intracellular $Ca^{2+}$ biosensors.

TABLE 1

Properties of the proteins BSA, CaM, and lysozyme. The molecular weight (MW) and Stokes Radii show the range of protein sizes under study with PD. The isoelectric point (pI) relates to protein charge and the number of surface lysines indicate the number of locations where the protein may bind to the AuNP.

| Protein | MW (kDa) | Stokes Radius (nm) | pI | Number of Surface Lysines |
|---|---|---|---|---|
| BSA | 66.50 | 3.48 | 4.7 | 30-35 |
| Lysozyme | 14.31 | 1.9 | 11.35 | 3 |
| CaM | 16.79 | 2.49 | 5.4 | 7-8 |

Figure 4:
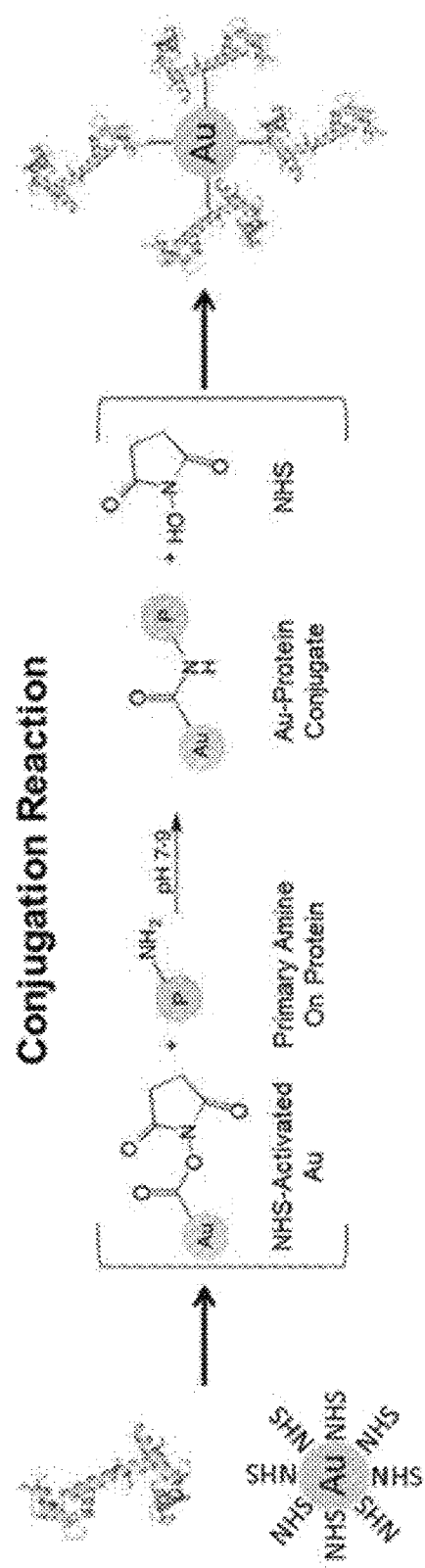
FIG. 4 schematically represents a nanoparticle protein conjugation reaction in accordance with investigations leading to nonlimiting aspects of the present invention. Proteins, in this case Calmodulin (CaM), are introduced to 100 nm N-Hydroxysuccinimide (NHS)-activated gold nanoparticles (AuNPs) where the NHS on the particle and primary amine on the protein react to form covalent protein-conjugated nanoparticles. This particular reaction conjugates onto any of the surface lysines on the protein.
Figure 5:
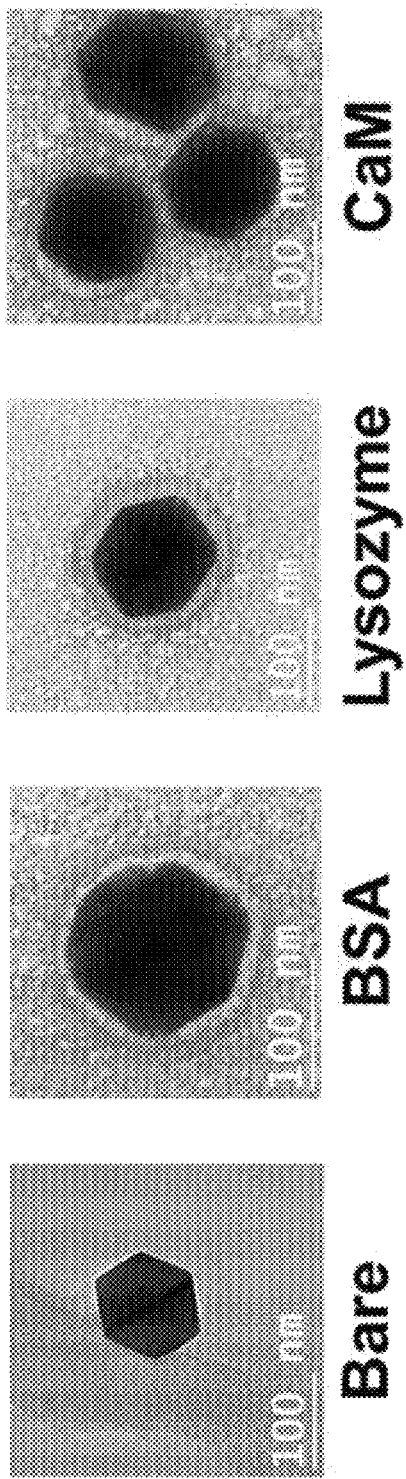
FIG. 5 includes Transmission Electron Microscopy (TEM) images of bare (i.e., no protein), BSA (bovine serum albumin), lysozyme, and CaM conjugated AuNPs, respectively. The AuNP itself appears as the larger dark object in the image. The protein coated particles exhibit a halo-like feature around the particle circumference. This halo is the conjugated protein, showing a minor change in contrast to the background of the image as compared to the AuNP. This is due to the fact that proteins are electron transparent.

BSA, lysozyme, and CaM were separately covalently attached to N-Hydroxysuccinimide (NHS) functionalized gold nanoparticles (AuNPs) via primary amine chemistry as schematically outlined in FIG. 4. Protein conjugation was analyzed using Zeta potential analysis, Transmission Electron Microscopy (TEM), Dynamic Light Scattering (DLS), and PD. Measurements of nanoparticle Zeta potential and ratiometric diffusivity as determined by TEM, DLS, and PD, respectively, for bare, BSA, lysozyme, and CaM conjugated gold nanoparticles are summarized in Table 2 (below). Bare, BSA, Lysozyme and CaM conjugated particles had Zeta potentials of −6.37±0.71, −7.13±0.71, −10.11±0.85, and −12.03±0.47 mV, respectively. This change in Zeta potential between the bare AuNP and the other three samples indicates protein attachment. TEM imaging showed that bare AuNPs have a hard and distinct edge whereas protein covered particles had blurred boundaries (FIG. 5). This blurring indicates that the proteins have successfully attached to the gold particle surface, as the blurring specifies a less electron dense material (i.e. the protein), as compared to gold. The diameter of the bare AuNPs measured with TEM was 125.82±2.359 nm. The protein layer thickness of each conjugated AuNP was 18.05±3.191 nm for BSA, 32.69±3.542 nm for lysozyme, and 15.16±4.21 nm for CaM.

In order to determine the difference in the diffusion coefficient between the AuNP samples using PD, the ratio of the diffusion coefficient of bare AuNPs to the diffusion coefficient of protein conjugated-AuNP samples was calculated as a diffusion ratio ($D_{bare}/D$). The diffusion ratio is the value of the average diffusion coefficient of the protein-conjugated AuNPs relative to the diffusion coefficient of the bare AuNP. The ratio of the diffusion coefficients of two particle species in solutions of identical temperature and viscosity is inversely proportional to the ratio of their particle sizes:

$$\frac{D_{AuNP}}{D_{protein\_AuNP}} = \frac{a_{protein\_AuNP}}{a_{AuNP}} \quad (4)$$

where $D_{protein\_AuNP}$ and $a_{protein\_AuNP}$ are the diffusion coefficient and hydrodynamic radius of the protein conjugated particle and $D_{AuNp}$ and $a_{AuNp}$ are those of the bare AuNPs (also referred to herein as $D_{bare}$ and $a_{bare}$). From this equation, it is apparent that as particle size increases due to biomolecular conjugation the diffusion coefficient of the conjugated particles decreases.

Representing the diffusion coefficient of the biomolecular conjugated nanoparticles as a ratio presents a distinct advantage of measuring these changes with shorter time measurements. When PD is used to find the time-averaged diffusion coefficient, a large number of images must generally be recorded in order to be accurate. Accuracy in this instance is defined as being within 2% of the theoretical diffusion coefficient value (as described by the Stokes-Einstein equation, Eq. 2). Although a large image set does reduce experimental error, measurements of absolute diffusion coefficients can take 20 minutes or longer because of the need for a large number of images. When using the diffusion coefficient ratio ($D_{bare}/D$), fewer images (frames) are needed to produce experimental error of the same scale as those of the absolute diffusion coefficient. Therefore accurate measurements of the radiometric diffusion can be performed in much shorter times.

For example, the absolute diffusion coefficient and error of 100 nm AuNPs was measured using 100 frames and using 10,000 frames, respectively. A t-test comparing the two errors showed that they were statistically different ($p<0.05$), indicating that 100 frames was not sufficient to produce an accurate measurement. In contrast, a t-test comparing the error from the ratiometric approach using 100 images (about 8 seconds of data) and the error of the absolute diffusion coefficient using 10,000 frames was found to not be statistically different ($p>0.05$). Therefore, it is possible to take advantage of the similarity in the scaled error to reduce the number of images and the overall measurement time The ratiometric diffusion coefficients of the conjugated BSA, lysozyme, CaM, and bare AuNPs were calculated with PD in order to demonstrate that the technique can be sensitive enough to detect a significant difference between the samples. PD measurements were compared to DLS and TEM measurements (Table 2). Using this technique, a statistically significant difference ($p<0.05$) in the ratiometric diffusion coefficient between the bare, CaM, BSA, and lysozyme coated AuNPs (image a of FIG. 6) was determined. For example, lysozyme AuNPs gave the biggest change in diffusivity which correlates well with the change in particle size measured via TEM. On the other hand, CaM conjugated AuNPs have the smallest change in the PD measured diffusion coefficient. PD was sensitive enough to measure a difference between all four particle samples with statistical significance.

Figure 6:
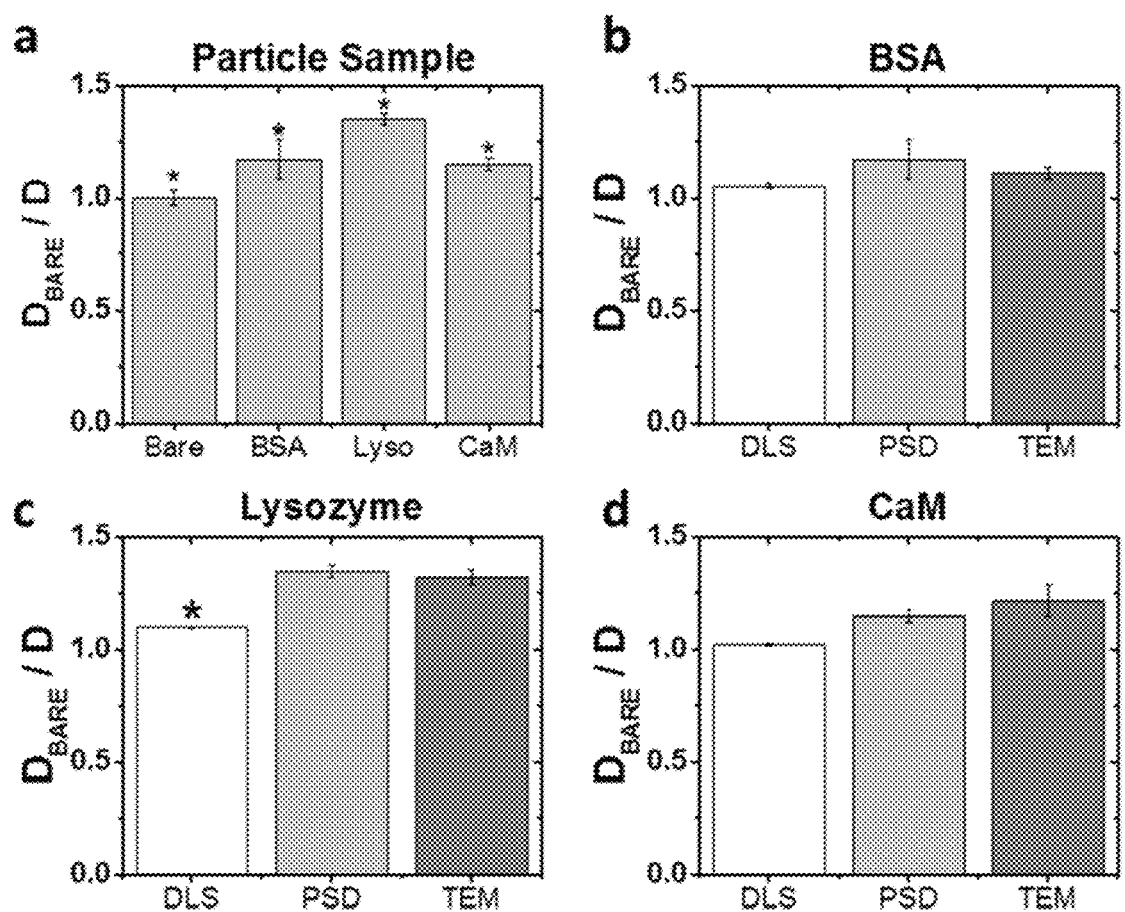
FIG. 6 includes graphs representing comparisons of nanoparticle sizing techniques (DLS, PD, and TEM) performed on samples of BSA, lysozyme ("Lyso"), and CaM conjugated AuNPs. Image "a" compares the normalized diffusion ratios for the BSA, lysozyme, and CaM AuNP samples and a bare AuNP sample; PD shows a statistically significant ($p<0.05$) detectable difference in the ratiometric diffusion coefficient ($D_{bare}/D$) between each sample of the four sample groups (N=24). Images b-d compare ($D_{bare}/D$) calculated from DLS, PD, and TEM data for the BSA, lysozyme, and CaM conjugated AuNPs, respectively.

In order to validate the accuracy of the PD method, the normalized diffusion ratio determined by PD was compared to TEM and DLS data for each protein-conjugated sample (images b-d of FIG. 6). In all cases (CaM, lysozyme, and BSA), there was no statistically significant difference between the TEM and PD measurement systems ($p>0.05$) (images b-d of FIG. 6). In contrast, DLS measurements often exhibited lower ratiometric values as compared to TEM and PD, with a statistically significant difference in measurements for the lysozyme conjugated particles (image c of FIG. 6). Additionally, PD values were found to be consistently closer to the TEM data in comparison to DLS measurements. The difference between DLS and TEM for lysozyme, BSA, and CaM were 16.67%, 5.41%, and 16.02%, respectively whereas the difference between the TEM and PD was 2.27% (lysozyme), 5.41% (BSA), and 5.57% (CaM).

It was demonstrated that PD can predict the uniformity of a nanoparticle solution using Polydispersity Index (PdI) as an indicator. Polydispersity characterization is a factor in nanoparticle applications, as it is difficult to control sample-wide uniformity with surface conjugation chemistry, and often aggregation of particles can occur. Currently, DLS is the most common PdI measurement method.

Figure 7:
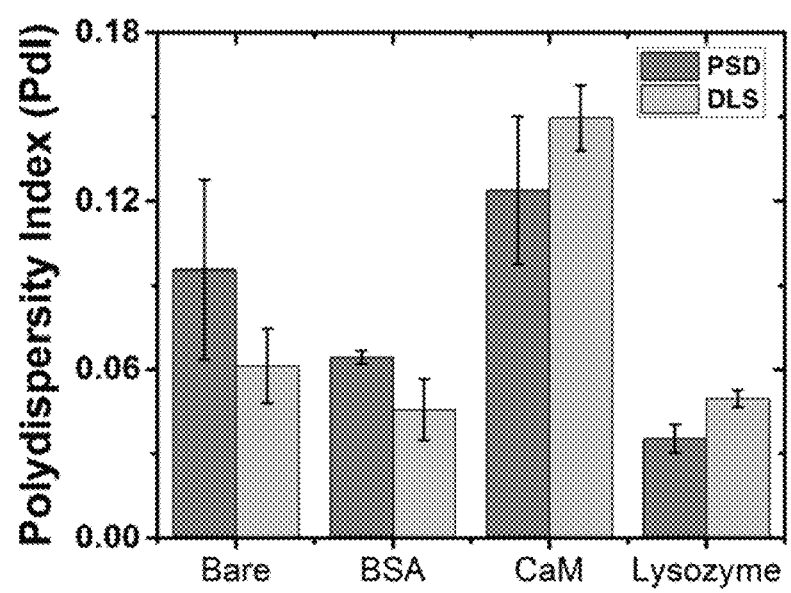
FIG. 7 is a graph representing a comparison of the polydispersity index values between PD and DLS for bare, BSA (bovine serum albumin), CaM, and lysozyme conjugated AuNP samples. The difference in the polydispersity index between the two techniques is statistically insignificant ($p>0.05$), indicating that PD can be used as a tool to determine sample uniformity.

To calculate sample PdI using PD, 100 images per data set were partitioned into areas (interrogation windows). Diffusion coefficient values were calculated from the nanoparticles within each area, and the array of values were fit to a normal distribution. A normal distribution was chosen in order to directly compare the PdI measurements with DLS, which also uses a normal distribution in its model. The PdI of the normal distribution was calculated according to Equation 3. PdI measurements for both PD and DLS are given in Table 3 (below) and shown graphically in FIG. 7. It was determined that there was no statistically significant difference between the PdI values measured using PD and DLS ($p>0.05$). Both techniques determined that CaM conjugated nanoparticles showed the least uniformity between the samples with PdI values of 0.12-0.15, indicating that this sample was polydisperse (FIG. 7 and Table 3). Conversely, lysozyme coupled AuNPs displayed the highest degree of uniformity with PdI values of 0.035-0.05, indicating this sample was monodisperse (FIG. 7 and Table 3).

Figure 8:
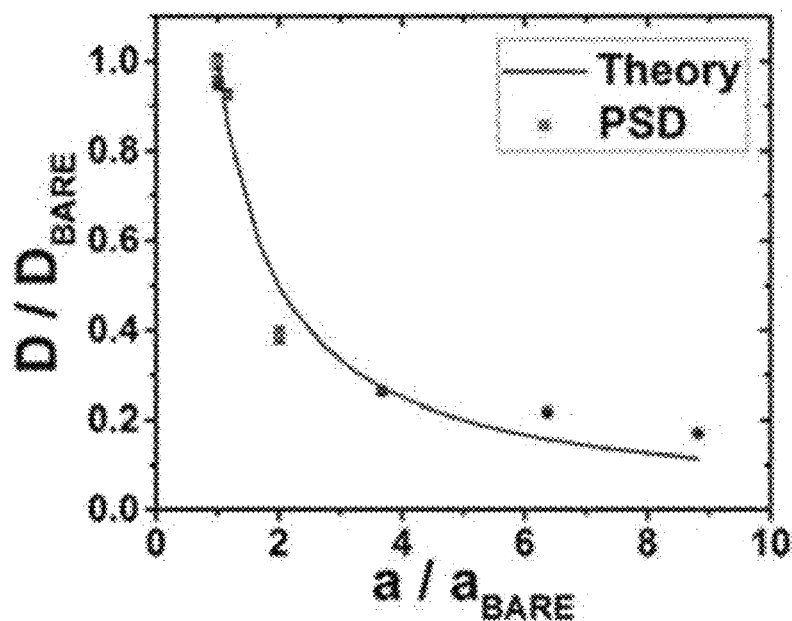
FIG. 8 is a plot representing the ratiometric diffusion coefficients for particles of 100 nm, 300 nm, 520 nm, 1 μm, and 2 μm in diameter, and 100 nm biomolecule conjugated particles measured by PD and compared to the theoretical diffusion coefficient (Equation 2—represented as a line). The Root Mean Squared Error (RMSE) between theory and experiments was 6.04%.

In order to compare experimental measurements of nanoparticle diffusion by PD to calculations of the diffusion coefficient by the Stokes-Einstein equation (Equation 2), the diffusion coefficients of bare particles with diameters of 100 nm, 300 nm, 520 nm, 1 μm, and 2 μm, and 100 nm particles conjugated to CaM, lysozyme, and BSA were measured using PD. For each case, the ratiometric diffusion was calculated as described above in Equation 4. As predicted, the ratiometric value measured by PD decreased as the particle's hydrodynamic radius (a in Equation 1) increased (FIG. 8). The values of the ratiometric diffusion coefficients for these particles are presented in Tables 2 and 4. The Root Mean Squared Error (RMSE) between PD data and Stokes-Einstein predictions was found to be 6.04%. This small RMSE indicates that PD can be used to determine the diffusion coefficient for a large range of particle sizes, extending beyond the nano-regime.

In order to determine the expected percent change in the diffusion coefficient, PD was used to calculate the average thickness of biomolecules bound to the nanoparticles and compared to predictions by the Stokes-Einstein equation (Equation 1). To identify how the diffusion coefficient of nanoparticles would change upon conjugation of biomolecules to the nanoparticle surface, the percent change in diffusion coefficient of various nanoparticles ranging in diameter from 40-300 nm was predicted as greater amounts of biomolecules increased the hydrodynamic radius of the particles (a function of the thickness of the biomolecules layering onto the surface during conjugation). A relationship between biomolecule thickness/layering and the nanoparticle hydrodynamic radius may be defined as:

$$\text{thickness}_{(biomolecule\_layer)} = a_{total} - a_{bare} \quad (5)$$

Further, the percent change in diffusion coefficient may be calculated using:

$$\%\Delta D = \frac{D_{AuNP} - D_{protein\_AuNP}}{D_{AuNP}} \cdot 100 \quad (6)$$

Figure 9:
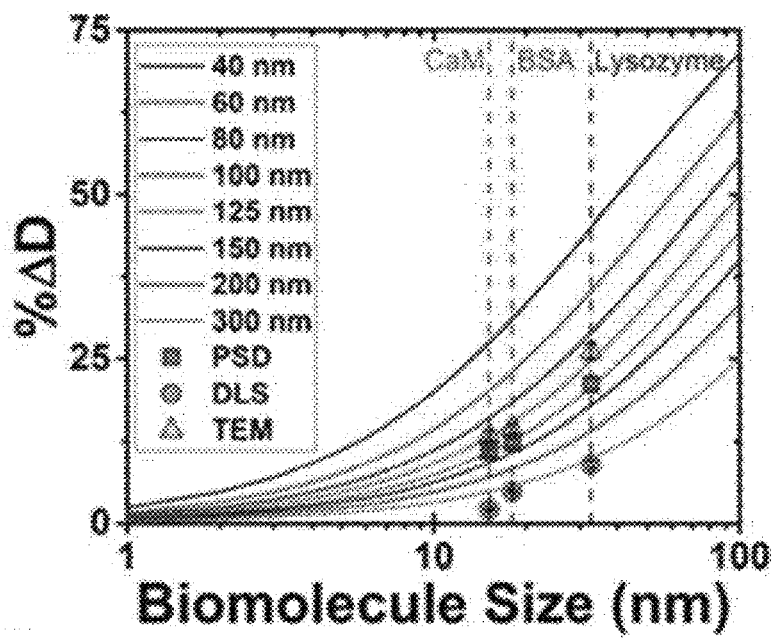
FIG. 9 is a plot representing the percent change in the diffusion coefficient (%ΔD) theoretically determined for particles ranging from 40 nm to 300 nm in diameter as a function of the biomolecule size conjugated to the AuNP (represented as lines). The experimental data points (for the BSA, CaM, and lysozyme conjugated AuNPs) were calculated from TEM, PD, and DLS results and compared with theory. The dotted lines correspond to the thickness of the layer of each biomolecule as measured by TEM.

The solid lines in FIG. 9 predict how the diffusion coefficient of particles, ranging from 40 nm to 300 nm in diameter, would change as a function of the size of the thickness of the biomolecule layer(s) bound to the particle surface.

Different nanoparticle characterization methods (TEM, DLS, and PD) were used to measure the percent change of the diffusion coefficient of protein conjugated nanoparticles (FIG. 9) in order to compare these methods to predictions from Equation 6 and observe how the relative consistency of the methods. TEM was used to directly measure the size of nanoparticles before and after biomolecule conjugation and percent change in diffusion coefficient was calculated according to Equation 7.

$$\%\Delta D = \frac{1/a_{AuNP} - 1/a_{protein\_AuNP}}{1/a_{AuNP}} \cdot 100 \quad (7)$$

The diffusion coefficient of bare and biomolecule conjugated 100 nm AuNP was measured using PD and DLS. The percent change in the diffusion coefficient was calculated using Equation 6. Within each characterization method lysozyme conjugated AuNPs consistently had the largest percent change in diffusion coefficient followed by CaM, and then BSA with the smallest percent change in diffusion coefficient (FIG. 9).

In order to compare the accuracy measurement methods, the measured change in percent diffusion (dots in FIG. 9, values in Table 5 below) was compared to the predictions of the percent change in diffusion (solid lines in FIG. 9). It was seen that the change in the diffusion coefficient measured for the different biomolecules by TEM fell along the 100 nm predicted curve while PD fell along the 125 nm curve and DLS fell along the 300 nm curve. Because the particle's true size is about 100 nm in diameter, this TEM result matched well with predictions. In contrast to TEM, which is a direct measurement of size, PD and DLS estimate particle hydrodynamic radius. Thus it is not surprising that the PD measurement falls along the 125 nm curve as the nanoparticle's effective hydrodynamic diameter is different due to an electric dipole layer that forms about the particle's surface. In contrast, the DLS data was closest to the 300 nm curve. This indicates a larger inaccuracy in measuring the change in diffusion coefficient as a function of different size biomolecule additions. Although DLS also measured the hydrodynamic radii, baseline DLS measurements of the bare 100 nm AuNPs remained at about 125 nm in diameter. Therefore the percent change in the diffusion coefficient based on DLS measurements indicate inaccuracies in the measurement system. These discrepancies can be attributed to two factors, a) the assumption in DLS that the particles in solution are spherical and b) as more biomolecule is added to the nanoparticle, the refractive index properties of the solution change. Given that DLS is an intensity-based measurement system, these factors can induce errors to the true particle size.

Figure 10:
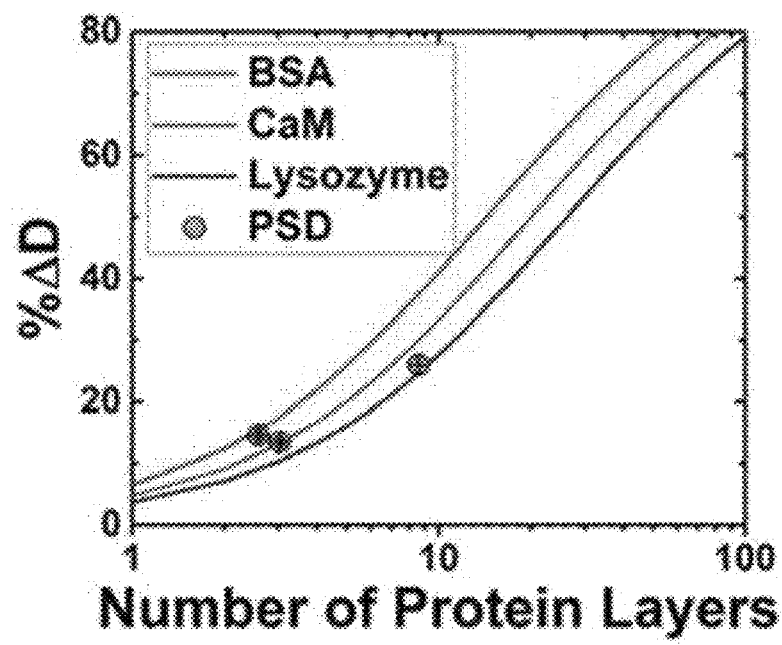
FIG. 10 is a plot representing the percent change in diffusion coefficient (%ΔD) as a function of the number of protein layers added to the 100 nm AuNP. Each protein's Stokes radius changes the diffusion coefficient of the particle. The change in the diffusion for a bare particle compared to a protein conjugated particle allows to predict, on average, the number of layers of protein present on the particle using PD.

Characterizing the number of layers present on a nanoparticle is desirable for researchers performing layer-by-layer assemblies such as designing tunable vehicles for drug delivery devices. By coupling the Stokes-Einstein equation (Equation 2) and the biomolecule Stokes radius (Table 1) with PD measurements (Table 2) the average number of layers of protein that are conjugated to the nanoparticles may be estimated. The diffusion coefficient measured with PD is substituted into the Stokes-Einstein equation, calculating the overall thickness of the protein layer, as follows:

$$\%\Delta D = \left(\frac{n(a_{protein})}{a_{AuNP} + n(a_{protein})}\right) \quad (8)$$

where n is the number of protein layers attached to the particle. In FIG. 10, there are three theoretical curves that demonstrate how the change in the diffusion coefficient (calculated using Equation 6) allows for the estimation of the number of layers of protein (CaM, lysozyme, and BSA) that are conjugated on a 125 nm AuNP. Applying the Stokes radii ($a_{protein}$) of lysozyme, BSA, and CaM (found in Table 1), this change was predicted with Equation 8. Initially, the percent change in the diffusion coefficient was calculated from PD measurements (Equation 6) and this calculation was used to estimate the average number of protein layers, n, that were conjugated to the AuNP surface (FIG. 10, dots). The lysozyme conjugated particles have the largest number of layers on the AuNP surface whereas the BSA had the least amount. This agrees with TEM measurements and can be seen in FIG. 5.

Figure 11:
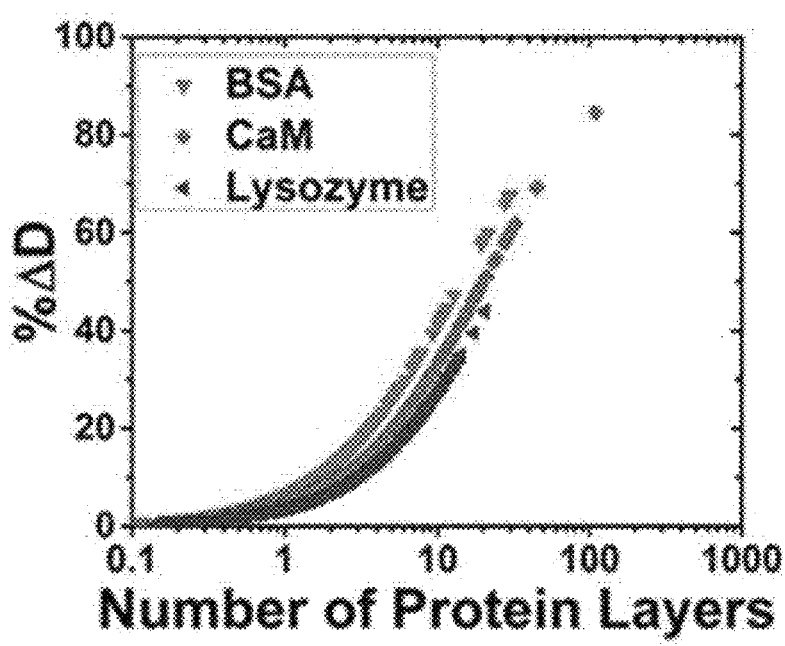
FIG. 11 is a plot representing diffusion coefficients experimentally determined for each separate interrogation area within an image frame. Based on the variation of diffusion coefficient measurements, the thickness of biomolecule layers on the AuNPs were predicted.

In addition to estimating the average number of protein layers on the nanoparticles, one may characterize the variation in the number of protein layers throughout the nanoparticle sample. For example, with antibody coated nanoparticles used for drug therapy, it may be important to know how much of the therapeutic is attached to the particle surface. Particles with varying layers throughout the sample or particles with a large number of layers may see effects in affinity, functionality, and steric hindrance. Therefore, a method to use PD measurements was established to estimate the variation in the protein layering within the sample. In a set of images, each area (interrogation window) may exhibit a different diffusion coefficient value. The range of these diffusion coefficient values may be used to calculate the variation in the number of biomolecule layers of a particle sample. The percent change of the diffusion coefficient (Equation 6) for each area (keeping $D_{AuNP}$ constant at 3.56E-12 m²/s) may be calculated and Equation 8 may be used to calculate the number of protein layers per area. The results for the variation of biomolecule layers for each sample (lysozyme, CaM, and BSA) are plotted in FIG. 11 where every point represents a measurement in a single area.

If a protein conjugated nanoparticle sample is more uniform, then there will be less distribution of points along the x-axis. This is because each of the areas would have a similar diffusion coefficient to one another. With data presented in this way one can visualize the distribution of the number of protein layers within a sample to compliment the PdI measurement. For example, lysozyme conjugated nanoparticles had the smallest distribution along the x-axis, indicating that the surface coating was more uniform throughout the sample. This agrees with the PdI measurement of the lysozyme particles (PdI=0.049). In contrast, the CaM modified AuNPs, had the largest distribution of number of protein layers which is in agreement with the large PdI value (0.124). In the samples, it was observed that clusters of CaM-conjugated nanoparticle samples had predicted layers of 100 and 200 layers, indicating aggregation. Visualizing the distribution of the number of protein layers in this way may be a useful technique to discern nanoparticle aggregation versus a continuous distribution of nanoparticle sizes. These differences might not be seen by visual inspection of a sample, nor by PdI measurement, but can be readily discerned by estimating the distribution of the number of protein layers.

TABLE 2

Ratiometric diffusion coefficients ($D_{AuNP}/D_{protein-AuNP}$) of TEM, DLS, and PD measurements of protein conjugated gold nanoparticles and their corresponding Zeta Potential values.

| Sample | TEM | DLS | PD | Zeta Potential (mV) |
|---|---|---|---|---|
| BSA | 1.22 ± 0.071 | 1.05 ± 0.009 | 1.17 ± 0.091 | −7.13 ± 0.71 |
| Lysozyme | 1.32 ± 0.033 | 1.10 ± 0.002 | 1.35 ± 0.025 | −10.11 ± 0.85 |
| CaM | 1.11 ± 0.026 | 1.02 ± 0.004 | 1.15 ± 0.026 | −12.03 ± 0.47 |

TABLE 3

DLS and PD Polydispersity Index (PdI) measurements for bare, BSA, CaM, and lysozyme conjugated AuNPs.

| Sample | PD PdI | DLS PdI |
|---|---|---|
| Bare AuNP | 0.0956 ± 0.03193 | 0.0613 ± 0.01313 |
| BSA AuNP | 0.0645 ± 0.00238 | 0.0457 ± 0.01091 |
| CaM AuNP | 0.1238 ± 0.02639 | 0.1497 ± 0.01157 |
| Lysozyme AuNP | 0.0354 ± 0.00516 | 0.0496 ± 0.00287 |

TABLE 4

Inverse ratiometric diffusion coefficient of polystyrene particles ($D/D_{bare}$) from 300 to 2000 nm in diameter measured experimentally by PD as well as their predicted value using the Stokes-Einstein equation.

| Sample | Prediction | PD |
|---|---|---|
| 300 nm | 0.4960 | 0.389 ± 0.017 |
| 520 nm | 0.2714 | 0.264 ± 0.006 |
| 1000 nm | 0.1569 | 0.218 ± 0.003 |
| 2000 nm | 0.1134 | 0.170 ± 0.002 |

Note that the ratiometric diffusion coefficient in this table is calculated as $D/D_{bare}$ to reflect the inverse relationship between particle size and diffusion coefficient.

TABLE 5

Percent change in diffusion (% ΔD) determined by TEM, PD, and DLS measurements

| Sample | TEM | PD | DLS |
|---|---|---|---|
| Lysozyme | 21.19 ± 0.033 | 26.09 ± 1.305 | 8.93 ± 0.446 |
| BSA | 12.19 ± 0.545 | 14.38 ± 0.719 | 4.85 ± 0.243 |
| CaM | 10.90 ± 0.610 | 13.40 ± 0.700 | 2.15 ± 0.108 |

In the above investigations, gold nanoparticles preparation was as follows. N-Hydroxysuccinimide Ester (NHS)-activated 100 nm gold nanoparticles (Cytodiagnostics. Ontario, Canada) were conjugated via primary amine chemistry to the surface lysines of BSA (Sigma), lysozyme (Sigma Aldrich. St. Louis, Mo.) or calmodulin (Enzo Life Sciences. Farmingdale, N.Y.) following standard protocols. Briefly, proteins were diluted in 20 mM Hepes pH 7.4 containing 100 mM NaCl. Each conjugation reaction was initiated with addition of the proteins at a final volume of 0.133 mg/mL and gently agitated at room temperature for 2 hours. 10 µL of 1.0 M Tris was added to 990 µL of the particle solution to block any NHS groups remaining on the beads' surfaces. Samples were incubated with 1.0 M Tris with agitation for another hour then centrifuged for 30 minutes at 400×g to remove liquid. Conjugated samples were resuspended in NaCl-free buffer, to minimize any size variation due to charge effects, and their size and PdI were measured using a Zetasizer (Malvern. United Kingdom). A schematic of the conjugation method is described in FIG. 4.

Polystrene particle preparation was as follows. 300 nm, 520 nm, 1 µm, and 2 µm red fluorescent polystyrene particles (Fluoro-Max, Thermo Scientific, MA, USA) were centrifuged according to the manufacturer's protocols and resuspended in 20 mM Hepes pH 7.4 in order to maintain similar buffer settings to the prepared gold nanoparticles. The particles were ultrasonicated for 15 seconds in order in ensure full dispersion and resuspension. Particle size was measured using a Zetasizer (Malvern. United Kingdom).

Zeta potential was measured using both Malvern Zetasizer's Nano ZS and Nano ZS90 models. Measurements were taken to ensure that both instruments provided the same readings. All samples were analyzed using Dynamic Light Scattering (DLS) to determine their hydrodynamic radius and the polydispersity of the sample (PdI). Standard 1 mL disposable polystyrene cuvettes were used (DTS0012, Malvern Instruments, Westborough, Mass.). Additionally the Zeta potentials of these modifications were recorded with DTS1060 cuvettes (Malvern Instruments, Westborough, Mass.).

Transmission electron microscopy (TEM) was performed using 400 mesh Formvar carbon coated copper grids (Electron Microscopy Sciences, FCF400-Cu-50) for imaging. First, the grids were treated with glow discharge in order to facilitate wetting of the surface. 5 µL of the gold particle sample was placed onto the mesh for 2 minutes followed by negative staining with 0.2% uranyl acetate (UA) in order to discern the protein layer on the particle surface. Samples were imaged with a Tecnai T20 TEM (FEI, Hillsboro, Oreg.) and processed using Gatan Digital Micrograph.

PD was performed as follows. Glass cover slips (No. 1 Thickness, Erie Scientific, Portsmouth, N.H.) were rinsed and sonicated with water, acetone, isopropanol, and ethanol sequentially and dried with compressed air. The surfaces were treated using corona discharge for wettability of the sample. 2 millimeter thick adhesive silicon wells (HT315, McMaster-Carr, Elmhurst, Ill.) were adhered onto the glass cover slips. Seven microliters of nanoparticle samples were pipetted into the fluid chambers and covered with a second glass cover slip. The liquid touched both the top and bottom surface to form complete liquid bridge in order to avoid free surfaces which otherwise induced both vibrations as well as evaporative effects of the solution. The 100 nm gold nanoparticle samples were observed using dark field microscopy due to Rayleigh scattering. Dark field microscopy was performed using a 0.9 NA dark field air condenser (Nikon) and adapted onto an inverted microscope (Nikon Eclipse TE2000-U). 300 nm, 520 nm, 1 µm, and 2 µm particles were imaged using fluorescence microscopy via a fluorescent illumination lamp (Xcite series 120PC, EXFO Life Sciences & Industrial Division, Canada) attached to the inverted microscope. The objective used was 40×ELWD with a numerical aperture of 0.6. The movements of these diffraction-limited spots are imaged using a CCD camera with 1200×1600 pixel resolution with 2×2 binning at 13.3 fps (16-bit grayscale PCO.1600, PCO AG, Germany). Individual pixel size was 7.4×7.4 µm$^2$. Image acquisition was controlled using PCO software (CamWare V3.07, PCO AG, Germany). In order to maintain the same temperature and viscosity conditions for assuming ratiometric diffusion coefficients, PD measurements of all prepared particle samples were taken within hours of each other. Using our camera setup we have 3000 to 4000 particles in the microscope's field-of-view. 100 frames were recorded per PD measurement. 100 images were used in order to discern the change of Brownian motion between the different particle solutions while maintaining short time durations for potential comparison between this technique and other laboratory sizing equipment. For the PdI measurements with PD, measurements were performed in triplicate in order to compare with DLS, which also performs its measurements in groups of three.

Dark field images resulting from the PD were analyzed in EDPIV, a PIV analysis software. The interrogation window (area) was determined as the average display in which 8 to 10 particles were maintained within the window. Data was either ensemble averaged (for ratiometric diffusion coefficient) or individually measured per interrogation window (for PdI). Correlation data was post-processed and fit to a 5-point Gaussian distribution. The correlation peak width were calculated for both cross-correlation (sc) and autocorrelation (sa) data to determine the diffusion coefficient using an in-house MATLAB code.

In view of the above investigations, the PD process described herein uses dark field or fluorescence imagery for diffusometry of a non-flowing fluid sample having a relatively small volume, providing for characterization of particles much smaller than previously possible. In addition, PD may use diffusometry to determine the polydispersity index of the particles. If desired, PD provides the ability to predict the number of protein layers on the particles based on the polydispersity index and Brownian motion of the particles.

While the invention has been described in terms of specific or particular embodiments and investigations, it is apparent that other forms could be adopted by one skilled in the art. For example, the analyzer and its components could differ in appearance and construction from the embodiments described herein and shown in the drawings, functions of certain components of the analyzer could be performed by components of different construction but capable of a similar (though not necessarily equivalent) function, processing parameters such as temperatures and durations could be modified, and steps of PD could be performed using other devices. Accordingly, it should be understood that the invention is not limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A system comprising:
   an imaging device;
   means for recording a series of images of a fluid sample comprising particles suspended therein over a period of time;
   means for analyzing the series of images to determine an average displacement of the particles over the time period using a cross-correlation that correlates an area from a first image of the series of images obtained at a first time ($t_1$) with the area from a second image of the series of images subsequently obtained at a second time ($t_2$); and
   means for determining a diffusion coefficient of the particles based on the average displacement of the particles using the cross-correlation;
   wherein the particles have biomolecules bound thereto, and the system further comprises means for determining an average thickness of the biomolecules bound to the particles based on the diffusion coefficient.

2. The system of claim 1, further comprising means for determining the uniformity of the particles within the fluid sample based on the diffusion coefficient.

3. The system of claim 1, further comprising means for determining a number of biomolecule layers on the particles and a variation of the number of biomolecule layers on the particles.

4. The system of claim 1, wherein the system is configured to analyze particles having a diameter or maximum dimension of two micrometers or less.

5. The system of claim 1, wherein the analyzing means further uses a second correlation and the determining means calculates the diffusion coefficient from peak widths of the cross-correlation and the second correlation.

6. The system of claim 5, wherein the determining means calculates the diffusion coefficient from the peak widths of the cross-correlation and the second correlation using:

$$D = \frac{s_c^2 - s_a^2}{16M^2 \Delta t}$$

where D is the diffusion coefficient, $s_c$ and $s_a$ are, respectively, the peak widths of the cross-correlation and the second correlation measured at 1/e of peak heights thereof, M is magnification under which the series of images were recorded, and $\Delta t$ is time between the first and second times ($t_1, t_2$).

7. A method comprising:
   providing a sample having particles suspended in a fluid;
   obtaining and recording at least first and second images of the sample, the first image obtained at a first time ($t_1$) and the second image subsequently obtained at a second time ($t_2$);
   determining an average displacement of the particles in an area of the first and second images during a time period ($\Delta t$) between the first time ($t_1$) and the second time ($t_2$) using a cross-correlation that correlates the area from the first and second images; and then
   determining a diffusion coefficient of the particles in the area of the first and second images based on the average displacement of the particles during the time period ($\Delta t$) using the cross-correlation;
   wherein the particles have biomolecules bound thereto, further comprising characterizing the conjugation of the biomolecules and the particles, wherein an increase in an absolute hydrodynamic radius of the particles relates to a decrease in the diffusion coefficient of the of the particles.

8. The method of claim 7, further comprising determining the uniformity of the particles within the sample based on the diffusion coefficient.

9. The system of claim 7, further comprising determining an average thickness of the biomolecules bound to the particles based on the diffusion coefficient.

10. The system of claim 7, further comprising determining a number of biomolecule layers on the particles and a variation of the number of biomolecule layers on the particles.

11. The method of claim 7, wherein the determining of the average displacement of the particles further uses a second correlation and the determining of the diffusion coefficient of the particles calculates the diffusion coefficient from peak widths of the cross-correlation and the second correlation.

12. The method of claim 11, wherein the determining of the diffusion coefficient of the particles calculates the diffusion coefficient from peak widths of the cross-correlation and the second correlation using:

$$D = \frac{s_c^2 - s_a^2}{16M^2 \Delta t}$$

where D is the diffusion coefficient, $s_c$ and $s_a$ are, respectively, the peak widths of the cross-correlation and the second correlation measured at 1/e of peak heights thereof, M is magnification under which the series of images were recorded, and $\Delta t$ is the time period between the first and second times ($t_1, t_2$).

13. A method comprising:
   providing a sample having particles suspended in a fluid;
   obtaining and recording a series of images of the sample over a period of time;
   partitioning each of the series of images into interrogation areas;
   determining the average displacement of the particles in each of the interrogation areas in each of the series of images over the time period;
   determining a diffusion coefficient of the particles in each of the interrogation areas in each of the series of images based on the average displacement of the particles; and then
   determining an average diffusion coefficient of the particles by averaging the diffusion coefficients in each of the interrogation areas in each of the series of images.

14. The method of claim 13, wherein the particles have biomolecules bound thereto, wherein the diffusion coefficient of the particles is represented in the determining step as a ratio of particles without biomolecules bound thereto to biomolecule conjugated particles.

15. The method of claim 13, wherein the particles have biomolecules bound thereto, further comprising characterizing the conjugation of the biomolecules and the particles, wherein an increase in an absolute hydrodynamic radius of the particles relates to a decrease in the diffusion coefficient of the of the particles.

16. The method of claim 13, further comprising determining a number of biomolecule layers on the particles and a variation of the number of biomolecule layers on the particles.

17. The method of claim 13, wherein the determining of the average displacement of the particles uses an autocorrelation and uses a cross-correlation that correlates in each of the interrogation areas in each of the series of images over the time period, and the determining of the diffusion coefficients of the particles calculates the diffusion coefficients from peak widths of the autocorrelation and the cross-correlation.

* * * * *